(12) United States Patent
Iijima et al.

(10) Patent No.: US 10,513,971 B2
(45) Date of Patent: Dec. 24, 2019

(54) VALVE CONTROL DEVICE

(71) Applicant: Nissan Motor Co., Ltd., Yokohama-shi, Kanagawa (JP)

(72) Inventors: Kazuki Iijima, Kanagawa (JP); Osamu Ooki, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 21 days.

(21) Appl. No.: 15/758,773

(22) PCT Filed: Sep. 25, 2015

(86) PCT No.: PCT/JP2015/077019
§ 371 (c)(1),
(2) Date: Mar. 9, 2018

(87) PCT Pub. No.: WO2017/051465
PCT Pub. Date: Mar. 30, 2017

(65) Prior Publication Data
US 2018/0283263 A1    Oct. 4, 2018

(51) Int. Cl.
*F02B 31/06* (2006.01)
*F02D 9/02* (2006.01)
(Continued)

(52) U.S. Cl.
CPC ............... *F02B 31/06* (2013.01); *F02D 9/02* (2013.01); *F02D 9/1065* (2013.01);
(Continued)

(58) Field of Classification Search
CPC .. F02B 31/06; F02B 2275/48; F16K 37/0083; F16K 31/046; F02D 41/0002;
(Continued)

(56) References Cited

U.S. PATENT DOCUMENTS 5,927,250 A    7/1999    Nishida
6,178,947 B1 *  1/2001    MacHida ............... F02D 11/106
                                          123/396

(Continued)

FOREIGN PATENT DOCUMENTS

GB    2499893 A    9/2013
JP    9-242591 A    9/1997
(Continued)

*Primary Examiner* — Joseph J Dallo
(74) *Attorney, Agent, or Firm* — Global IP Counselors, LLP

(57) ABSTRACT

An ECM determines a failure exist and a failure site in a control valve device from first and second failure diagnoses. In the first failure diagnosis, a failure is determined to have occurred if an opening amount that represents an absolute value of a difference between a detected opening amount and a target opening amount of a valve body is greater than a preset threshold when the target opening amount of the valve body is constant for a predetermined time. In the second failure diagnosis, a failure is determined to have occurred if an opening amount that represents the absolute value of the difference between the opening amount of the valve body when fully open or fully closed and the detected opening amount is greater than the preset threshold when a portion rotating integrally with the valve body has been pressed against a stopper continuously for a predetermined time.

11 Claims, 5 Drawing Sheets

(51) Int. Cl.
*F02D 9/10* (2006.01)
*F02D 11/10* (2006.01)
*F16K 31/04* (2006.01)

(52) U.S. Cl.
CPC .......... *F02D 11/107* (2013.01); *F16K 31/046* (2013.01); *F02B 2275/48* (2013.01); *F02D 2011/101* (2013.01)

(58) Field of Classification Search
CPC .... F02D 41/222; F02D 41/221; F02D 9/1065; F02D 11/107; F02D 9/02; F02D 2041/0015; F02D 2011/101; Y02T 10/146; Y02T 10/42
See application file for complete search history.

(56) References Cited

U.S. PATENT DOCUMENTS

| | | | | |
|---|---|---|---|---|
| 8,210,153 B2* | 7/2012 | Otaki | .................... | F02D 9/1015 123/184.56 |
| 8,234,053 B2* | 7/2012 | Takayanagi | .......... | F02D 41/221 123/480 |
| 9,163,544 B2* | 10/2015 | Wollants | ................... | F01N 5/02 |
| 9,212,637 B2* | 12/2015 | Kimura | ............ | F02M 35/10386 |
| 9,546,622 B2* | 1/2017 | Ishihara | ............... | F02M 35/112 |
| 2005/0126639 A1* | 6/2005 | Ens | ..................... | F16K 37/0083 137/554 |
| 2006/0081208 A1* | 4/2006 | Sturdy | ................. | F02D 9/1065 123/184.55 |
| 2008/0091330 A1* | 4/2008 | Simpson | ............. | F02D 41/0002 701/102 |
| 2009/0164097 A1 | 6/2009 | Uda | | |
| 2011/0252875 A1* | 10/2011 | Grossmann | ............... | F02D 9/10 73/114.31 |
| 2012/0001105 A1 | 1/2012 | Hayashi et al. | | |
| 2013/0008417 A1* | 1/2013 | Sankar | ............... | F02D 41/0047 123/568.12 |
| 2014/0224219 A1* | 8/2014 | Carey | ................. | F02D 41/3845 123/447 |

FOREIGN PATENT DOCUMENTS

| | | |
|---|---|---|
| JP | 2000-110589 A | 4/2000 |
| JP | 2005-9365 A | 1/2005 |
| JP | 2012-12982 A | 1/2012 |

* cited by examiner

VALVE CONTROL DEVICE

CROSS-REFERENCE TO RELATED APPLICATIONS

This application is a U.S. National stage application of International Application No. PCT/JP2015/077019, filed Sep. 25, 2015.

BACKGROUND

Field of the Invention

The present invention relates to a valve control device for a valve provided in a flow channel through which a fluid flows.

Background Information

Japanese Laid-Open Patent Application No. 2012-12982 (hereinafter referred to as Patent Document 1), for example, discloses a valve control device that determines that there is a failure in the transmission path of the driving force to a shaft that holds a valve when the detected value of a rotation angle sensor that detects the opening amount of the valve that opens and closes an intake passage is a value outside of the normal detection values within the valve operating range that is set in advance.

However, with the device of Patent Document 1, it is not possible to determine whether the failure involves, for example, the abnormal operation of a valve or an actuator that drives the valve, or the valve opening amount detected by the rotation angle sensor not matching the actual valve opening amount.

That is, in Patent Document 1, since the failure location cannot be determined, there is the risk that the failure cannot be responded to with the minimum required repair.

SUMMARY

The valve control device according to the present invention comprises a valve that is provided in a passage through which fluid flows and that opens and closes the passage; an actuator that drives the valve; a sensor that detects the opening amount of the valve; a first stopper that regulates the movement of the valve further in the opening direction than the fully open position of the valve or a second stopper that regulates the movement of the valve further in the closing direction than the fully closed position of the valve; a first diagnostic unit that determines whether the detected opening amount is outside of a first predetermined range with respect to a target opening amount of the valve; a second diagnostic unit that determines whether the detected opening amount is outside of a second predetermined range with respect to the opening amount when the valve is fully open or the opening amount when the valve is fully closed, in a state in which a portion rotating integrally with the valve is pressed against the first stopper or the second stopper; and a failure determination unit that determines whether a given failure involves a failure of the valve or actuator, or a failure of the sensor, from the determination result of the first diagnostic unit and the determination result of the second diagnostic unit.

According to the present invention, it becomes possible to determine the failure location from the determination result of the first diagnostic unit and the determination result of the second diagnostic unit. As a result, it becomes possible to narrow down the failure location, and to respond to the failure with the minimum required repair.

DETAILED DESCRIPTION OF THE EMBODIMENTS

Figure 1:
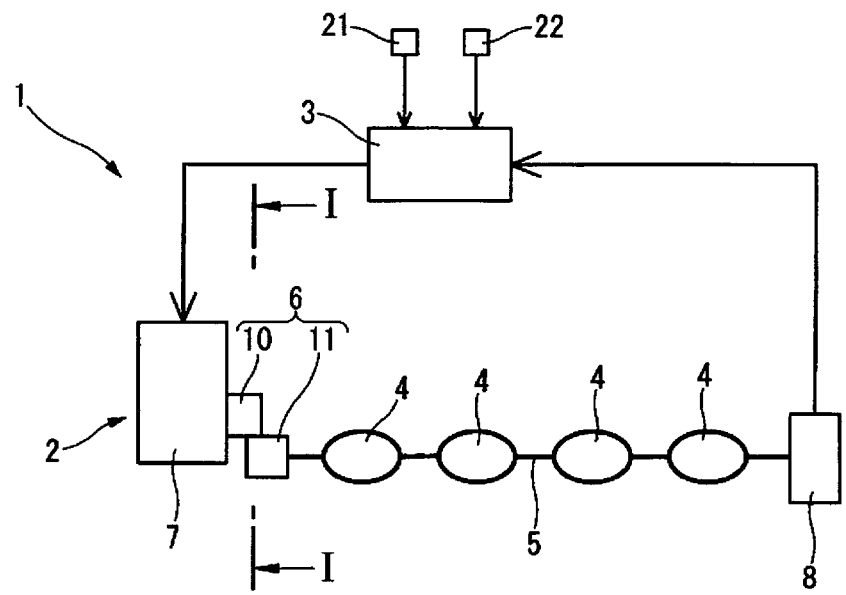
FIG. 1 is a system view schematically illustrating a schematic overview of a tumble control valve control device to which the present invention is applied.
Figure 2:
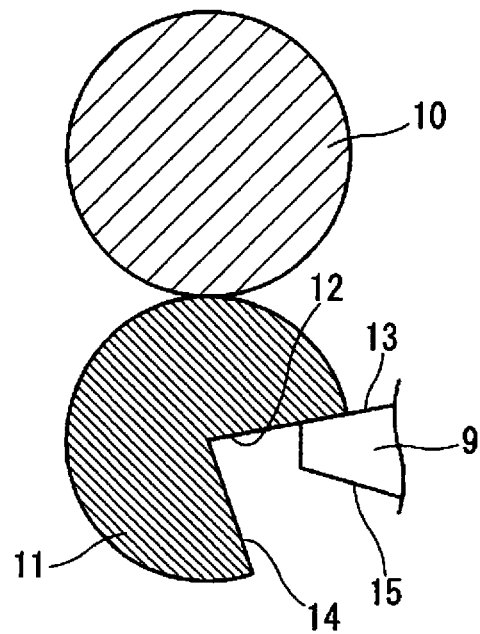
FIG. 2 is a cross-sectional view along line I-I of FIG. 1.

One embodiment of the present invention will be described in detail below based on the drawings. FIG. 1 is a system view schematically illustrating a schematic overview of a tumble control valve control device 1 to which the present invention is applied. FIG. 2 is an explanatory view schematically illustrating a cross section taken along line I-I of FIG. 1.

As a valve control device, the tumble control valve control device 1 is roughly configured from a tumble control valve device 2 and an ECM (engine control module) 3 that controls the tumble control valve device 2.

The tumble control valve device 2 imparts a tumble flow to gas inside a cylinder by closing a portion of an intake branch passage (not shown) and is roughly comprised of a valve body 4 as a valve disposed inside each intake branch passage, a rotational shaft 5 that integrally rotates with each valve body 4, an actuator 7 that is linked to one end of the rotational shaft 5 via a gear speed reduction mechanism 6, a sensor 8 linked to the other end of the rotational shaft 5, and a stopper 9 that regulates the rotation of the rotational shaft. The present embodiment is an example applied to a four-cylinder internal combustion engine mounted in a vehicle as a drive source, in which four valve bodies 4 are attached to one rotational shaft 5.

Each valve body 4 opens and closes a portion of each intake branch passage at once, and the valve opening amount of each valve body 4 (TCV opening amount) is the same.

The rotational shaft 5 is driven by an actuator 7, and opens and closes the valve body 4 of each intake branch passage simultaneously.

The gear speed reduction mechanism 6 is configured from, for example, an actuator side gear 10 coaxially mounted on an output shaft (not shown) of the actuator 7 and a rotational shaft side gear 11 coaxially mounted on the rotational shaft 5, and the external teeth of the actuator side gear 10 and the external teeth of the rotational shaft side gear 11 intermesh, whereby the rotation of the output shaft of the actuator 7 is decelerated and transmitted to the rotational shaft 5. The output shaft of the actuator, the actuator side gear 10, and the rotational shaft side gear 11 integrally rotate with the valve body 4.

The sensor 8 detects the rotation angle of the rotational shaft 5 integrally rotated with the valve body 4. That is, the sensor 8 is a valve opening amount sensor that detects the opening amount of the valve body 4.

The actuator 7 has, for example, an electric motor as a drive source, and is driven based on a command from the ECM 3. The rotational shaft 5 is rotationally driven by the actuator 7 to open and close the valve body 4.

The stopper 9 is formed projecting from the outer perimeter side of the rotational shaft side gear 11 toward the rotational shaft gear, and is, for example, provided to a housing (not shown), or the like, of the tumble control valve control device 2.

The stopper 9 comprises a first stopper surface 13 as a first stopper that can engage with an open-side stopper surface 12 provided to the rotational shaft side gear 11, and a second stopper surface 15 that can engage with a close-side stopper surface 14 provided to the rotational shaft side gear 11, as illustrated in FIG. 2.

The first stopper surface 13 regulates the movement of the valve body 4 further in the opening direction than a predetermined fully open position, and regulates the rotation of the valve body 4 in the opening direction by coming into contact with the open-side stopper surface 12 of the rotational shaft side gear 11, which is a portion rotating integrally with the valve body 4, when the opening amount of the valve body 4 is fully open. That is, the first stopper surface 13 defines the limit position of the valve body 4 on the opening direction side of a normal movable range.

The second stopper surface 15 regulates the movement of the valve body 4 further in the closing direction than a predetermined fully closed position, and regulates the rotation of the valve body 4 in the closing direction by coming in contact with the close-side stopper surface 14 of the rotational shaft side gear 11, which is a portion rotating integrally with the valve body 4, when the opening amount of the valve body 4 is fully closed. That is, the second stopper surface 15 defines the limit position of the valve body 4 on the closing direction side of the normal movable range.

In other words, the fully open position and the fully closed position of the valve body 4 are the upper and lower limit positions, respectively, of the normal movable range of the valve body 4, and the first stopper surface 13 and the second stopper surface 15 are provided so as to define the upper and lower positions of the normal movable range of the valve body 4.

The ECM 3 comprises a microcomputer configured to include a CPU, a ROM, a RAM, and the like. Signals detected by various other sensors, such as, in addition to the type of sensor 8 described above, an accelerator position opening amount sensor 8 that detects an opening amount (depression amount) of an accelerator pedal 6 that is operated by a driver, a crank angle sensor 21 that detects the rotational speed (engine rotation speed) of the crankshaft (not shown), and an ignition switch 22 that detects an activation of the vehicle, are input to the ECM 3. The ECM 3 controls the opening amount of the valve body 4, the fuel injection amount, the fuel injection timing, the ignition timing of the internal combustion engine, the throttle opening amount, and the like, based on the detection signals from these various sensors. In addition, the ECM 3 is capable of detecting the voltage of a battery (not shown) mounted in a vehicle.

The ECM 3 is capable of calculating the opening amount of the valve body 4 of the tumble control valve device 2 based on the detection value of the sensor 8. That is, the ECM 3 also functions as a valve opening amount calculation unit that calculates the opening amount of the valve body 4.

In addition, the ECM 3 calculates a target opening amount of the valve body 4 of the tumble control valve device 2 based on the operating conditions of the internal combustion engine, that is, on the detection signals from the various sensors, and carries out feedback control such that the detected opening amount of the valve body 4 detected by the sensor 8 becomes the target opening amount. The target opening amount of the valve body 4 is determined in accordance with, for example, the load and the engine rotation speed; the valve body 4 is closed and the tumble flow is intensified as the load or the engine rotation speed decreases, and the valve body 4 is opened and the tumble flow is attenuated as the load or the engine rotation speed increases.

The ECM 3 then uses the detection value of the sensor 8 to carry out two types of failure diagnoses on the tumble control valve device 2: a first failure diagnosis (first failure diagnosis) and a second failure diagnosis (second failure diagnosis). That is, the ECM 3 also functions as a first diagnostic unit that carries out the first failure diagnosis, and a second diagnostic unit that carries out the second failure diagnosis.

In the first failure diagnosis (first failure diagnosis), it is determined whether or not the difference between the target opening amount of the valve body 4 and the detected opening amount of the valve body 4 detected by the sensor 8 is within a preset predetermined range. That is, it is determined whether or not the detected opening amount of the valve body 4 is outside of a first predetermined range with respect to the target opening amount of the valve body 4.

Specifically, in the first failure diagnosis, a failure is determined to be present (first failure diagnosis NG determination=1) when a $\Delta$TCV opening amount, which is the absolute value of the difference between the detected opening amount of the valve body 4 and the target opening amount of the valve body 4, is greater than a preset threshold value a that is set in advance, when the target opening amount of the valve body 4 (target value) is constant during a predetermined time T1, which is a first predetermined time, in a state in which a predetermined diagnosis permission condition is satisfied. If the $\Delta$TCV opening amount is equal to or less than the preset threshold value a, it is not determined that a failure is present (first failure diagnosis NG determination=0). The predetermined time T1 is set taking into account the response time of the tumble control valve device 2.

Upon determining that a failure is present by the first failure diagnosis, the information may be stored in the ECM 3, and the first failure diagnosis may be not carried out during that trip (operating period from key-on to key-off). The predetermined diagnosis permission condition in the first failure diagnosis is established, for example, when the ignition switch 22 is on, the starter switch is off, and the battery voltage is equal to or greater than a predetermined threshold value.

In the second failure diagnosis (second failure diagnosis), it is determined whether or not the difference between the opening amount of the valve body 4 when fully open, or the opening amount when fully closed, and the detected opening amount of the valve body 4 detected by the sensor 8, is within a predetermined range that is set in advance, in a state in which a portion rotating integrally with the valve body 4 is pressed against the stopper 9. That is, in a state in which a portion rotating integrally with the valve body 4 is pressed against the stopper 9, it is determined whether or not the detected opening amount of the valve body 4 is outside of a second predetermined range with respect to the opening amount of the valve body 4 when fully open, or the opening amount when fully closed.

More specifically, in the second failure diagnosis, when a state, in which the target opening amount of the valve body 4 (target value) is the fully open or fully closed condition, is continued for a predetermined time T3, which is a third predetermined time in a state in which a predetermined diagnosis permission condition is satisfied, the pressing mode is set to "1," and the portion rotating integrally with the valve body 4 is pressed against the stopper 9. That is, a command is sent from the ECM 3 to the actuator 2 to cause the portion rotating integrally with the valve body 4 to press against the stopper 9. The predetermined time T3 is set taking into account the response time of the tumble control valve device 2. Then, a failure is determined to be present (second failure diagnosis NG determination=1) when the ΔTCV opening amount, which is the absolute value of the difference between the detected opening amount of the valve body 4 and the opening amount of the valve body 4 when fully open, or the opening amount when fully closed, is greater than the threshold value a that is set in advance, in a state where a portion rotating integrally with the valve body 4 is pressed against the stopper 9 has continued for a predetermined time T2, which is a second predetermined time. If the ΔTCV opening amount is equal to or less than the preset threshold value a, it is not determined that a failure is present (second failure diagnosis NG determination=0). The predetermined time T2 is set such that, even if the actual valve opening amount of the valve body 4 were to deviate with respect to the target valve opening amount of the valve body 4, by a command being sent from the ECM 3 to the actuator 2 to cause the portion rotating integrally with the valve body 4 to be pressed against the stopper 9, the portion rotating integrally with the valve body 4 is sufficiently pressed against the stopper 9.

Upon determining that a failure is present by the second failure diagnosis, the information may be stored in the ECM 3, and the second failure diagnosis may be not carried out during that trip (operating period from key-on to key-off). The predetermined diagnosis permission condition in the second failure diagnosis is established, for example, when the ignition switch 22 is on, the starter switch is off, and the battery voltage is equal to or greater than a predetermined threshold value.

The ECM 3 determines the occurrence of a failure and the location of the failure in a tumble control valve device 2 from the latest results of the first failure diagnosis and the second failure diagnosis. That is, the ECM 3 also functions as a failure determination unit that determines a failure and the location of the failure in the tumble control valve device 2.

Upon determining that the detected opening amount is outside of the predetermined range in both the first failure diagnosis and the second failure diagnosis, the ECM 3 determines that something in the movable parts, such as the actuator 7, the valve bodies 4, or the like, is stuck. In other words, it is determined that something in the movable parts in the power transmission path from the actuator 7 to the valve body 4 is stuck.

Upon determining that the detected opening amount is outside of the first predetermined range only in the first failure diagnosis, from among the first failure diagnosis and the second failure diagnosis, the ECM 3 determines that the failure is due to an offset of the actuator 7 or the valve body 4 (deviation between the command from the ECM 3 and the actual operation). That is, it is determined that the actual opening amount of the valve body 4 has deviated from the target opening amount of the valve body 4, due to a failure on the actuator 7 or the valve body 4 side. When carrying out the second failure diagnosis in a state in which the actuator 7 or the valve body 4 side has undergone an offset failure, the offset portion is absorbed by the portion rotating integrally with the valve body 4 being pressed against the stopper 9, and the target opening amount and the detected opening amount match; therefore, it is not determined that the detected opening amount is outside of the second predetermined range.

Upon determining that the detected opening amount is outside of the second predetermined range only in the second failure diagnosis, from among the first failure diagnosis and the second failure diagnosis, it is determined that the failure is due to an offset of the sensor detection value (detected opening amount). That is, it is determined that the detected opening amount is deviated from the actual opening amount of the valve body 4 due to a failure of the sensor 8. When carrying out the first failure diagnosis in a state in which the sensor 8 has undergone an offset failure, the target opening amount and the detected opening amount will match due to a feedback control of the valve body 4; therefore, it is not determined that the detected opening amount is outside of the first predetermined range.

Here, the tumble control valve device 2 is roughly divided into a first unit that includes the actuator 7, the gear speed reduction mechanism 6, the rotational shaft 5, and the valve body 4, and a second unit that includes the sensor 8. That is, in the tumble control valve device 2, the sensor 8 is connected to the first unit, which has been integrated in advance. Therefore, in the case of a failure on the valve body 4 or the actuator 7 side, it is sufficient to replace only the first unit described above. In the case of a failure of the sensor 8, it is sufficient to replace only the sensor 8.

That is, by using the detection value of one sensor 8 and using two failure diagnoses in combination, it becomes possible to narrow down the failure location, and to respond to a failure in the tumble control valve device 2 with the minimum required repair.

If it is not determined that the detected opening amount is outside of the predetermined range in both the first failure diagnosis and the second failure diagnosis, it is determined that a failure is not present in the tumble control valve device 2.

Since the first failure diagnosis can be executed at any opening amount within the normal movable range of the valve body 4, the diagnosis is not limited to a valve body 4 in which the opening amount changes in two stages of fully open and fully closed, and can be applied to a valve body 4 in which the opening amount is changed in a multistage manner.

The first failure diagnosis is carried out when the target opening amount of the valve body 4 is continuously constant for a predetermined time T1. That is, since the first failure diagnosis is not carried out when the target opening amount of the valve body 4 changes a little at a time, it is possible to prevent an erroneous determination of the first failure diagnosis.

Since the first stopper surface 13 and the second stopper surface 15 are provided so as to define the upper and lower limit positions, respectively, of the normal movable range of the valve body 4, the second failure diagnosis can be carried out during actual operation of the tumble control valve device, i.e., during actual operation of the valve body 4.

When a state in which the target opening amount of the valve body 4 is the fully open or fully closed condition has continued for a predetermined time T3, the second failure diagnosis is carried out when the portion rotating integrally with the valve body 4 is pressed against the stopper 9 and a predetermined time T2 has further elapsed. That is, since the second failure diagnosis is not carried out when the target opening amount of the valve body 4 changes a little at a time, it is possible to prevent an erroneous determination of the second failure diagnosis. In addition, it is possible to carry out the second failure diagnosis in a state in which the target opening amount of the valve body 4 is maintained.

When the second failure diagnosis is carried out, the pressing of the portion rotating integrally with the valve body 4 against the stopper 9 is ended regardless of the determination result. That is, a state in which the pressing mode is "1" is ended after continuing for the predetermined time T2. In addition, even in a case in which the target opening amount of the valve body 4 changes before the predetermined time T2 elapses after pressing the portion rotating integrally with the valve body 4 against the stopper 9, the pressing mode is set to "0" and the pressing of the portion rotating integrally with the valve body 4 against the stopper 9 is ended.

As a result, it is possible to prevent the portion rotating integrally with the valve body 4 from unnecessarily pressing against the first stopper surface 13 or the second stopper surface 15 in order to suppress the power consumption of the actuator 7 and to avoid wear in a power transmission path from the actuator 7 to the valve body 4.

The power transmission path from the actuator 7 to the valve body 4 more specifically includes the actuator 7, the actuator side gear 10, the rotational shaft side gear 11, the rotational shaft 5 of the valve body 4, and the like. Therefore, the wear that occurs when the portion rotating integrally with the valve body 4 presses against the first stopper surface 13 or the second stopper surface 15 occurs in the portion where the actuator side gear 10 and the rotational shaft side gear 11 mesh with each other, between the portion rotating integrally with the valve body 4 and the first stopper surface 13, and between the portion rotating integrally with the valve body 4 and the second stopper surface 15.

Figure 3:
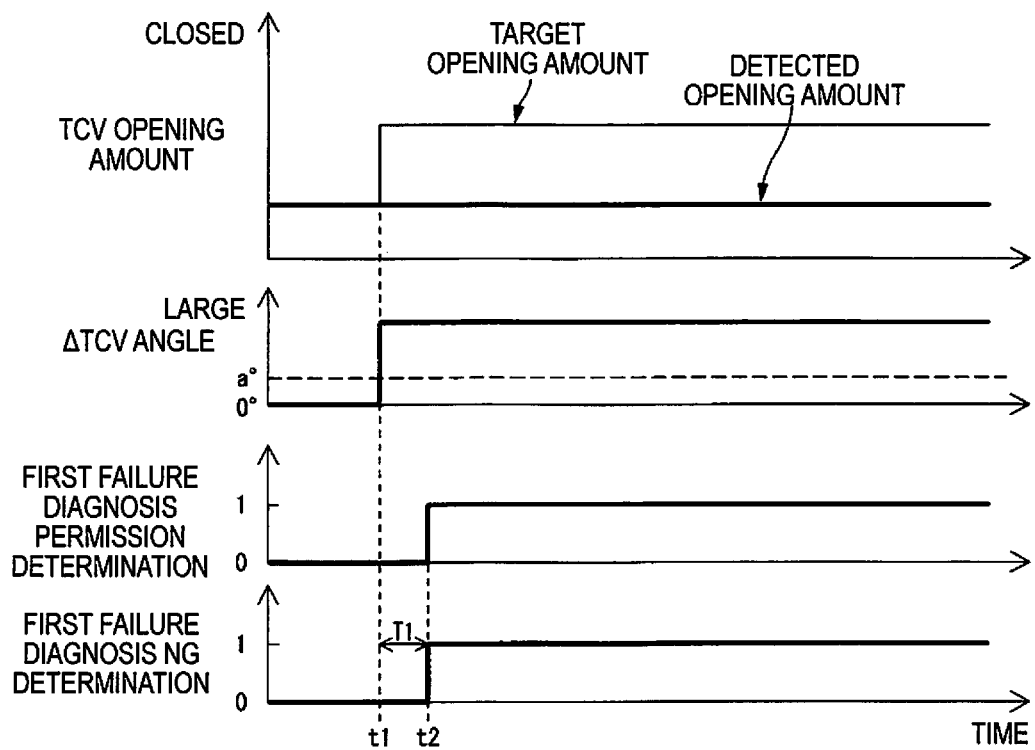
FIG. 3 is a timing chart illustrating one example of a first failure diagnosis.

FIG. 3 is a timing chart illustrating one example of a first failure diagnosis. It is assumed that the diagnosis permission condition of the first failure diagnosis has been satisfied since before time t1. At time t1, the target opening amount of the valve body 4 of the tumble control valve device 2 (thin solid line in FIG. 3) changes to the valve closing direction. Since the target valve opening amount is constant for a predetermined time T1 from time t1, the first failure diagnosis permission determination becomes "1" at time t2 after the predetermined time T1 has elapsed since time t1, and execution of the first failure diagnosis is permitted. Then, at time t2, at which point the first failure diagnosis is permitted, it is determined whether or not the LTCV opening amount, which is the absolute value of the difference between the target opening amount of the valve body 4 (thin solid line in FIG. 3) and the detected opening amount of the valve body 4 (thick solid line in FIG. 3), is greater than the preset threshold value a. Since the ΔTCV opening amount is larger than the preset threshold value a at time t2, it is determined that a failure is present, and the first failure diagnosis NG determination becomes "1."

Figure 4:
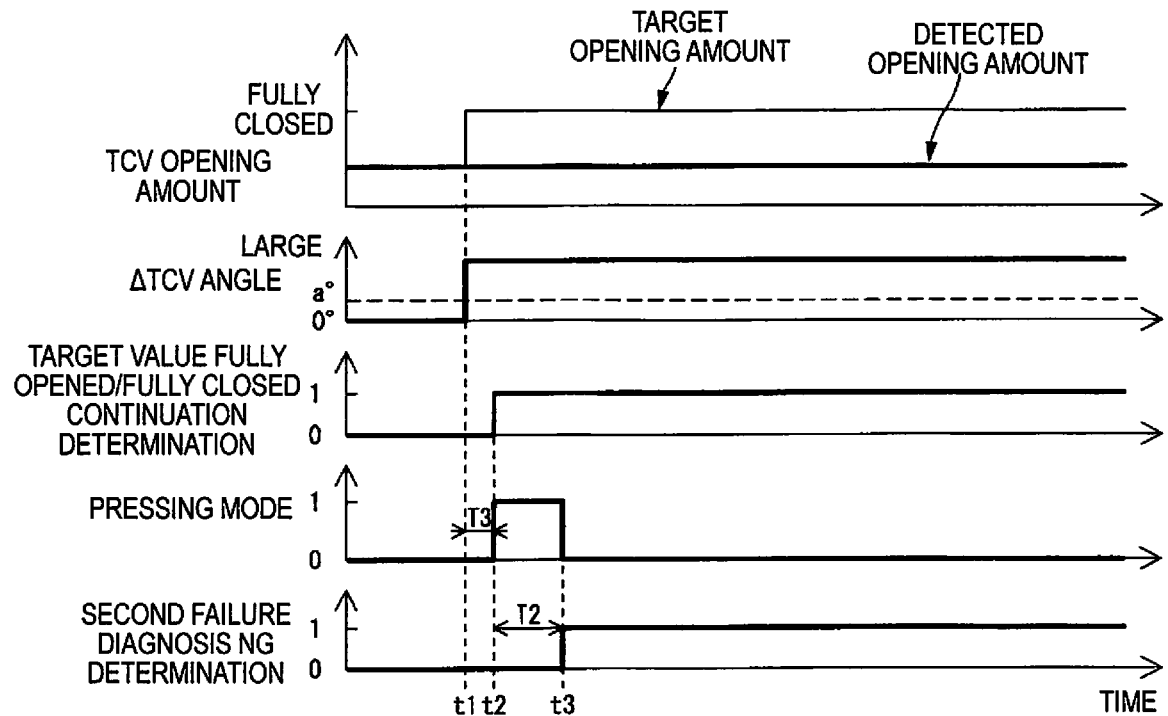
FIG. 4 is a timing chart illustrating one example of a second failure diagnosis.

FIG. 4 is a timing chart illustrating one example of a second failure diagnosis. It is assumed that the diagnosis permission condition of the second failure diagnosis has been satisfied since before time t1. At time t1, the target opening amount of the valve body 4 of the tumble control valve device 2 (thin solid line in FIG. 4) is changed to fully closed. Since the target valve opening amount is constant at fully closed for a predetermined time T3 from time t1, the target value fully open/fully closed continuation determination becomes"1" at time t2 after a predetermined time T3 has elapsed since time t1. Then, from time t2, at which point the target value fully open/fully closed continuation determination becomes "1," the pressing mode is set to "1" and the portion rotating integrally with the valve body 4 is pressed against the stopper 9. In the example of FIG. 4, since the target opening amount of the valve body 4 is fully closed, the actuator 7 is driven such that the close-side stopper surface 14 of the rotational shaft side gear 11 is pressed against the second stopper surface 15 of the stopper 9. Then, when the state in which the pressing mode is "1" is continued for a predetermined time T2 from time t2, the second failure diagnosis permission determination becomes "1" at time t3 after the predetermined time T2 has elapsed since time t2, and execution of the second failure diagnosis is permitted. Then, at time t3, at which point the second failure diagnosis is permitted, it is determined whether or not the ETCV opening amount, which is the absolute value of the difference between the target opening amount of the valve body 4 (thin solid line in FIG. 4) and the detected opening amount of the valve body 4 (thick solid line in FIG. 4), is greater than the preset threshold value a. Since the ΔTCV opening amount is greater than the preset threshold value a at time t3, it is determined that a failure is present, and the second failure diagnosis NG determination becomes "1."

Figure 5:
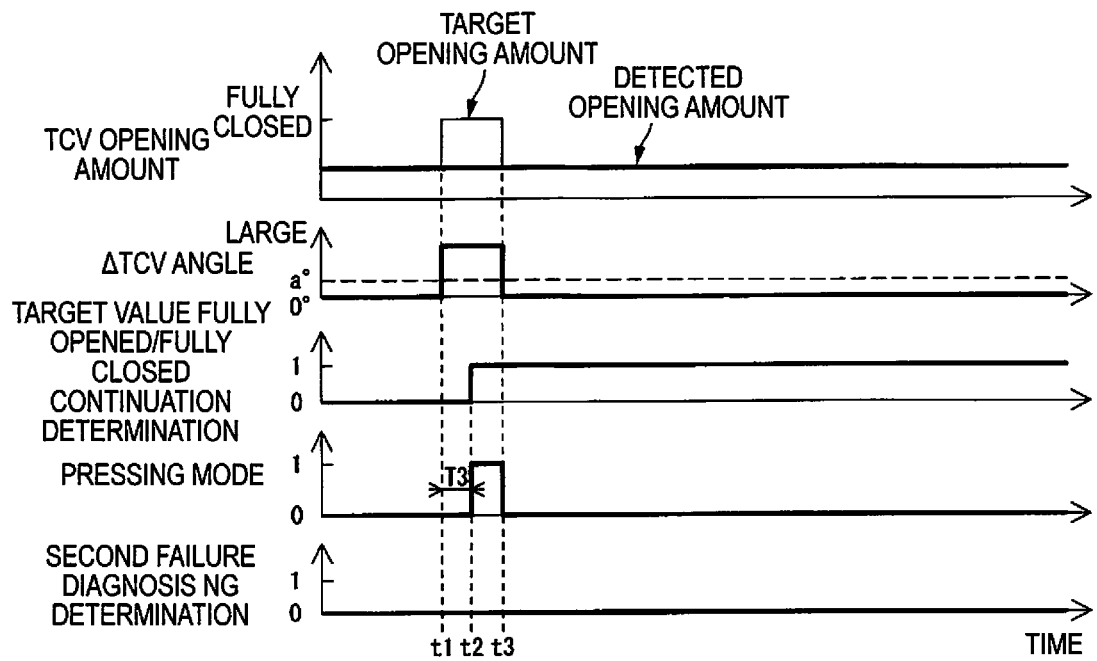
FIG. 5 is a timing chart illustrating one example of a second failure diagnosis.

FIG. 5 is a timing chart illustrating another example of a second failure diagnosis. It is assumed that the diagnosis permission condition of the second failure diagnosis has been satisfied since before time t1. At time t1, the target opening amount of the valve body 4 of the tumble control valve device 2 (thin solid line in FIG. 5) is changed to fully closed. Since the target valve opening amount is constant at fully closed for a predetermined time T3 from time t1, the target value fully open/fully closed continuation determination becomes "1" at time t2 after a predetermined time T3 has elapsed since time t1. Then, from time t2, at which point the target value fully open/fully closed continuation determination becomes "1," the pressing mode is set to "1" and the portion rotating integrally with the valve body 4 is pressed against the stopper 9. In the example of FIG. 5, since the target opening amount of the valve body 4 is fully closed, the actuator 7 is driven such that the close-side stopper surface 14 of the rotational shaft side gear 11 is pressed against the second stopper surface 15 of the stopper 9. Here, in the example of FIG. 5, the target opening amount of the valve body 4 is changed before the predetermined time T2 elapses from time t2. That is, since the target opening amount of the valve body 4 is changed at time t3, the second failure diagnosis NG determination is not carried out, and the second failure diagnosis NG determination does not become "1." The pressing mode becomes "0" at time t3, at which point the target opening amount of the valve body 4 is changed.

Figure 6:
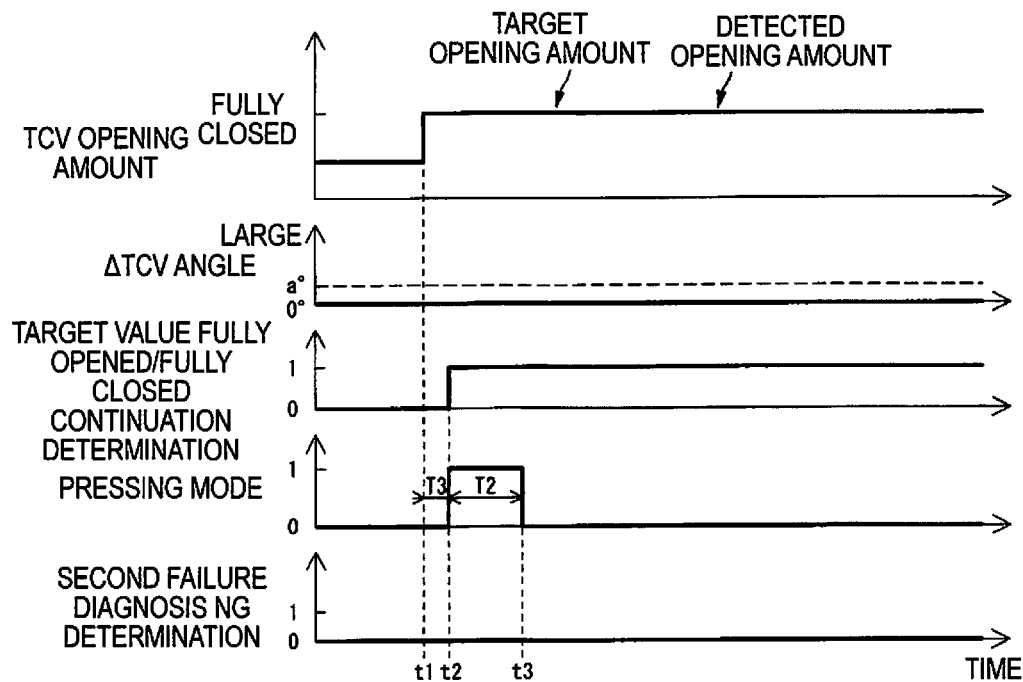
FIG. 6 is a timing chart illustrating one example of a second failure diagnosis.

FIG. 6 is a timing chart illustrating another example of a second failure diagnosis. It is assumed that the diagnosis permission condition of the second failure diagnosis has been satisfied since before time t1. At time t1, the target opening amount of the valve body 4 of the tumble control valve device 2 (thin solid line in FIG. 6) is changed to fully closed. Since the target valve opening amount is constant at fully closed for a predetermined time T3 from time t1, the target value fully open/fully closed continuation determination becomes "1" at time t2 after the predetermined time T3 has elapsed since time t1. Then, from time t2, at which point the target value fully open/fully closed continuation determination becomes "1," the pressing mode is set to "1" and the portion rotating integrally with the valve body 4 is pressed against the stopper 9. In the example of FIG. 6, since the target opening amount of the valve body 4 is fully closed, the actuator 7 is driven such that the close-side stopper surface 14 of the rotational shaft side gear 11 is pressed against the second stopper surface 15 of the stopper 9. Then, when the state in which the pressing mode is "1" is continued for a predetermined time T2 from time t2, the second failure diagnosis permission determination becomes "1" at time t3 after the predetermined time T2 has elapsed since time t2, and execution of the second failure diagnosis is permitted. Then, at time t3, at which point the second failure diagnosis is permitted, it is determined whether or not the ΔTCV opening amount, which is the absolute value of the difference between the target opening amount of the valve body 4 (thin solid line in FIG. 6) and the detected opening amount of the valve body 4 (thick solid line in FIG. 6), is greater than the preset threshold value a. At time t3, since the target opening amount of the valve body 4 and the detected opening amount of the valve body 4 coincide, and the ΔTCV opening amount is smaller than the preset threshold value a, it is determined that a failure is not present, and the second failure diagnosis NG determination does not become "1."

Figure 7:
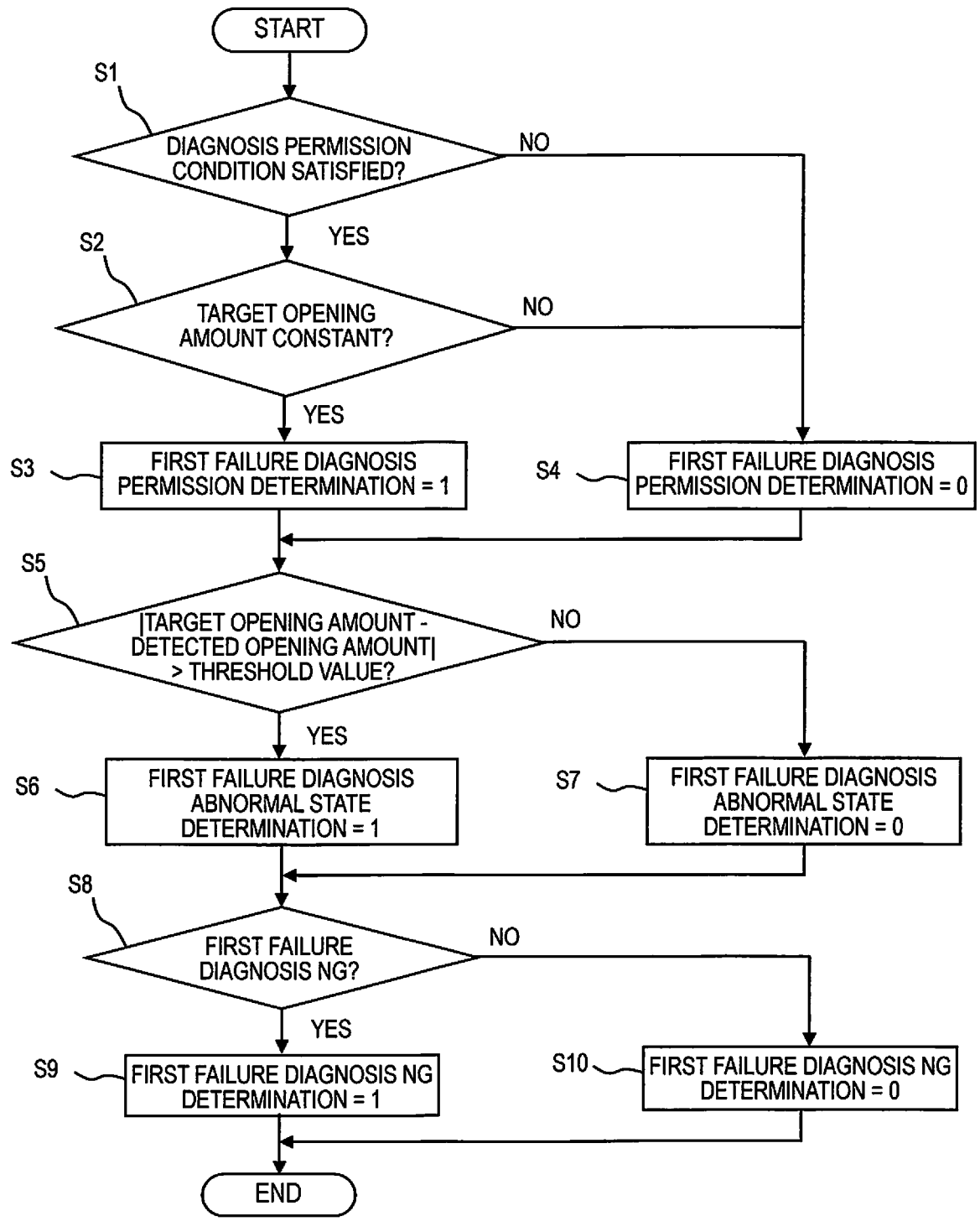
FIG. 7 is a flowchart illustrating the control steps of a first failure diagnosis.

FIG. 7 is a flowchart illustrating the process flow of a control of the first failure diagnosis. In S1, it is determined whether or not a diagnosis permission condition is satisfied. If the diagnosis permission condition is satisfied, the process proceeds to Step S2, and if not satisfied, the process proceeds to Step S4. In S2, it is determined whether or not the target opening amount of the valve body 4 is constant for a predetermined time T1; if constant, the process proceeds to Step S3, and if not, the process proceeds to Step S4. In S3, the first failure diagnosis permission determination is set to "1" and the process proceeds to Step S5. In S4, the first failure diagnosis permission determination is set to "0" and the process proceeds to Step S5. In S5, it is determined whether or not the absolute value of the difference between the target opening amount and the detected opening amount of the valve body 4 is greater than the preset threshold value a; if greater, the process proceeds to Step S6, and if not greater, the process proceeds to Step S7. In S6, a first failure diagnosis abnormal state determination is set to "1" and the process proceeds to Step S8. In S7, the first failure diagnosis abnormal state determination is set to "0" and the process proceeds to Step S8. In S8, the first failure diagnosis is carried out. That is, in S8, the process proceeds to Step S9 only when both the first failure diagnosis permission determination and the first failure diagnosis abnormal state determination are "1," and in other cases, the process proceeds to Step S10. In S10, the first failure diagnosis NG determination is set to "1." In S11, the first failure diagnosis NG determination is set to "0."

Figure 8:
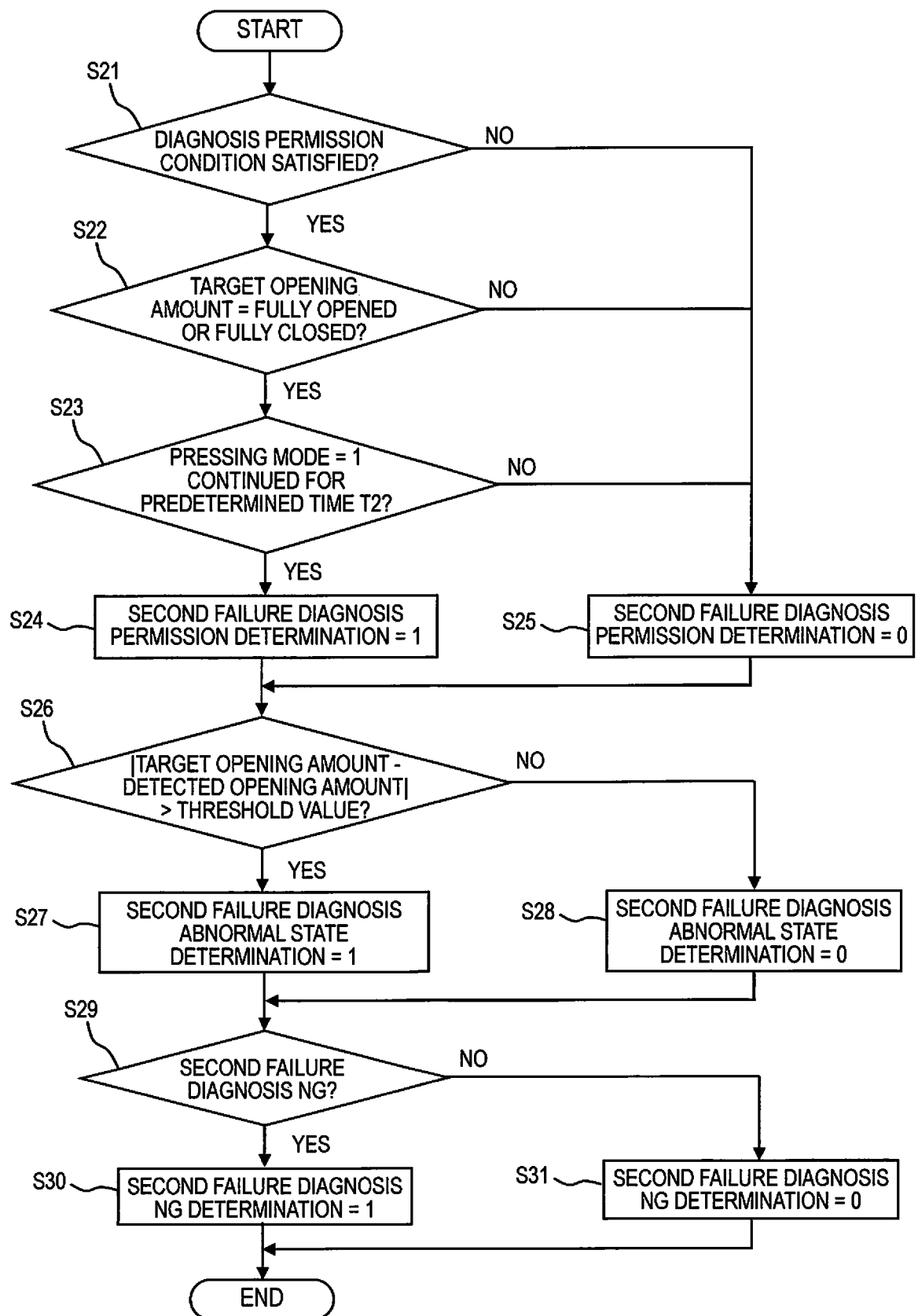
FIG. 8 is a flowchart illustrating the control steps of a second failure diagnosis.

FIG. 8 is a flowchart illustrating the process flow of a control of the second failure diagnosis. In S21, it is determined whether or not a diagnosis permission condition is satisfied. If the diagnosis permission condition is satisfied, the process proceeds to Step S22, and if not satisfied, the process proceeds to Step S25. In S22, it is determined whether or not a state in which the target opening amount of the valve body 4 is fully open or fully closed has been continued for a predetermined time T3; if yes, the process proceeds to Step S23, and if not, the process proceeds to Step S25. In S23, it is determined whether or not a state in which the pressing mode is "1" has been continued for a predetermined time T2; if yes, the process proceeds to Step S24, and if not, the process proceeds to Step S25. In S24, the second failure diagnosis permission determination is set to "1" and the process proceeds to Step S26. In S25, the second failure diagnosis permission determination is set to "0" and the process proceeds to Step S26. In S26, it is determined whether or not the absolute value of the difference between the target opening amount and the detected opening amount of the valve body 4 is greater than the preset threshold value a; if greater, the process proceeds to Step S27, and if not greater, the process proceeds to Step S28. In S27, the second failure diagnosis abnormal state determination is set to "1" and the process proceeds to Step S29. In S28, the second failure diagnosis abnormal state determination is set to "0" and the process proceeds to Step S29. In S29, the second failure diagnosis is carried out. That is, in S29, the process proceeds to Step S30 only when both the second failure diagnosis permission determination and the second failure diagnosis abnormal state determination are "1"; otherwise, the process proceeds to Step S31. In S30, the second failure diagnosis NG determination is set to "1." In S31, the second failure diagnosis NG determination is set to "0."

In the embodiment described above, if it is determined that a failure is present in one of the first failure diagnosis and the second failure diagnosis as a result of carrying out the first failure diagnosis and the second failure diagnosis, a warning lamp provided to the instrument panel of the vehicle is turned on to notify the driver that a failure has occurred.

When the target opening amount of the valve body 4 is fully open or fully closed, not only the second failure diagnosis but the first failure diagnosis may also be carried out.

The present invention is not only applicable to the tumble control valve control device 1 described above, but also to a device for controlling a valve provided in a flow channel through which fluid flows. That is, the present invention can be applied to an EGR valve provided in an EGR passage, a westgate valve that opens and closes a passage for bypassing a portion of the exhaust gas passage to the turbine in a supercharger, a swirl control valve provided in the intake branch passage of an internal combustion engine, and a device for controlling control valves, etc., provided in a cooling water passage.

Additionally, in the above-described embodiment, the threshold value used for the determination of the first failure diagnosis and the threshold value used for the determination of the second failure diagnosis are the same, but different threshold values may be used.

The invention claimed is:

1. A valve control device comprising:
   a valve provided in a passage through which fluid flows and that opens and closes the passage;
   an actuator that drives the valve;
   a sensor that detects an opening amount of the valve;
   a first stopper that regulates a movement of the valve further in an opening direction than a fully open position of the valve, or a second stopper that regulates the movement of the valve further in a closing direction than a fully closed position of the valve;
   a first diagnostic unit that determines whether or not the detected opening amount is outside of a first predetermined range with respect to a target opening amount of the valve, the first diagnostic unit being carried out when the target opening amount has been constant for a first predetermined time;

a second diagnostic unit that determines whether or not the detected opening amount is outside of a second predetermined range with respect to a fully-open target opening amount corresponding to the fully open position of the valve or a fully-closed target opening amount corresponding to the fully closed position of the valve, the second diagnostic unit being carried out when a pressing mode for pressing a portion rotating integrally with the valve against one of the first stopper and the second stopper has continued for a second predetermined time; and a failure determination unit that determines whether or not a failure of one of the valve or the actuator, and a failure of the sensor has occurred based on a determination result of the first diagnostic unit and a determination result of the second diagnostic unit, the failure determination unit determining the failure has occurred in the sensor upon determining that the detected opening amount is not outside the first predetermined range by the first diagnostic unit, and determining that the detected opening amount is outside the second predetermined range by the second diagnostic unit.

2. The valve control device according to claim 1, wherein upon determining that the detected opening amount is outside the first predetermined range by the first diagnostic unit, and determining that the detected opening amount is not outside the second predetermined range by the second diagnostic unit, the failure determination unit determines the failure has occurred in one of the actuator and the valve.

3. The valve control device according to claim 1, wherein the first diagnostic unit is configured to carry out a determination at all the opening amounts of the valve.

4. The valve control device according to claim 1, wherein the pressing mode is started when a state in which the target opening amount of the valve is one of fully open and fully closed has continued for a third predetermined time.

5. The valve control device according to claim 1, wherein the second diagnostic unit ends the pressing mode when the target opening amount changes.

6. The valve control device according to claim 1, wherein the first predetermined time is set in accordance with a response time of the valve control device.

7. The valve control device according to claim 1, wherein the sensor is configured and arranged to detect a rotation angle of the portion rotating integrally with the valve.

8. The valve control device according to claim 7, wherein the portion rotating integrally with the valve is a rotational shaft.

9. The valve control device according to claim 1, wherein the first diagnostic unit and the second diagnostic unit are carried out in a state in which a predetermined diagnosis permission condition is satisfied.

10. The valve control device according to claim 9, wherein
the predetermined diagnosis permission condition is satisfied when an ignition switch of a vehicle is on, a start switch of the vehicle is off, and a battery voltage of the vehicle is equal to or larger than a predetermined threshold value.

11. The valve control device according to claim 4, wherein
the third predetermined time is set in accordance with a response time of the valve control device.

* * * * *